US011146718B2

(12) United States Patent
Ta Van et al.

(10) Patent No.: US 11,146,718 B2
(45) Date of Patent: Oct. 12, 2021

(54) CAMERA ASSEMBLY AND ELECTRONIC DEVICE INCLUDING THE SAME

(71) Applicant: SAMSUNG ELECTRONICS CO., LTD., Suwon-si (KR)

(72) Inventors: Kiem Ta Van, Ha Noi (VN); Vuong Nguyen Trong, Bac Ninh (VN); Anh Tran Tuan, Bac Ninh (VN); Anh Nguyen Tuan, Bac Ninh (VN); Duong Nguyen Van, Bac Giang (VN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/994,093

(22) Filed: Aug. 14, 2020

(65) Prior Publication Data

US 2021/0185201 A1 Jun. 17, 2021

(30) Foreign Application Priority Data

Dec. 16, 2019 (KR) .................. 10-2019-0168254

(51) Int. Cl.
*H04N 5/225* (2006.01)
*H02H 9/02* (2006.01)
(Continued)

(52) U.S. Cl.
CPC ............ *H04N 5/2257* (2013.01); *H02H 9/02* (2013.01); *H04N 5/2252* (2013.01);
(Continued)

(58) Field of Classification Search
CPC .. H04N 5/2257; H04N 5/2252; H04N 5/2253; H04N 5/2254; H04N 5/247;
(Continued)

(56) References Cited

U.S. PATENT DOCUMENTS

2009/0052162 A1    2/2009  Richter et al.
2014/0346627 A1*  11/2014  Yamada ............ H01L 27/14618
                                                                     257/431
(Continued)

FOREIGN PATENT DOCUMENTS

JP       2013-042359 A     2/2013
KR       10-0863800 A     10/2008
(Continued)

OTHER PUBLICATIONS

International Search Report and Written Opinion (PCT/ISA/210 and PCT/ISA/237), dated Nov. 11, 2020 by International Searching Authority in International Application No. PCT/KR2020/010431.

*Primary Examiner* — Nicholas G Giles
(74) *Attorney, Agent, or Firm* — Sughrue Mion, PLLC

(57) ABSTRACT

A camera assembly embedded in an electronic device may include a plurality of camera modules, and a supporting frame configured to support the plurality of camera modules. At least one of the plurality of camera modules includes a lens driving assembly configured to move a lens barrel, a lens housing configured to accommodate the lens barrel and the lens driving assembly, a first circuit board on which an image sensor is provided, and a conductive connecting part configured to electrically connect the first circuit board and the lens driving assembly. The supporting frame includes a metal body configured to surround at least portions of edges of the lens housing, and a short-circuit prevention part provided on a surface of the metal body facing the conductive connecting part. The short-circuit prevention part includes a non-conductive material to block electrical contact between the metal body and the conductive connecting part.

20 Claims, 19 Drawing Sheets

(51) Int. Cl.
    *H04N 5/247*     (2006.01)
    *G02B 7/02*     (2021.01)
    *G02B 7/09*     (2021.01)
    *G03B 13/36*     (2021.01)
    *G02B 27/64*     (2006.01)
    *G03B 5/00*     (2021.01)
    *H04N 5/232*     (2006.01)

(52) U.S. Cl.
    CPC ......... *H04N 5/2253* (2013.01); *H04N 5/2254* (2013.01); *H04N 5/247* (2013.01); *G02B 7/021* (2013.01); *G02B 7/09* (2013.01); *G02B 27/646* (2013.01); *G03B 5/00* (2013.01); *G03B 13/36* (2013.01); *G03B 2205/0007* (2013.01); *H04N 5/23248* (2013.01)

(58) Field of Classification Search
    CPC ...... H04N 5/23248; H02H 9/02; G02B 7/021; G02B 7/09; G02B 27/646; G03B 5/00; G03B 13/36; G03B 2205/0007
    See application file for complete search history.

(56) References Cited

U.S. PATENT DOCUMENTS

| | | | |
|---|---|---|---|
| 2019/0004280 A1* | 1/2019 | Hu | ............... G03B 13/36 |
| 2019/0052162 A1* | 2/2019 | Lee | ............... H02K 41/0356 |
| 2019/0166287 A1 | 5/2019 | Lee | |
| 2020/0382687 A1 | 12/2020 | Lee | |

FOREIGN PATENT DOCUMENTS

| | | |
|---|---|---|
| KR | 10-2012-0065764 A | 6/2012 |
| KR | 10-2014-0086444 A | 7/2014 |

\* cited by examiner

CAMERA ASSEMBLY AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2019-0168254, filed on Dec. 16, 2019, in the Korean Intellectual Property Office, the disclosure of which is incorporated by reference herein in its entirety.

BACKGROUND

1. Field

The disclosure relates to a camera assembly and an electronic device including the same.

2. Description of Related Art

With the recent development of digital technology, various types of electronic devices, such as mobile communication terminals, smart phones, tablet personal computers (PCs), personal digital assistants, electronic notebooks, laptop computers, or wearable devices, are widely used.

Such electronic devices have reached the stage of mobile convergence that encompasses functions of other devices. For example, an electronic device may provide communication functions such as voice call and video call, message transmission/reception functions such as a short message service (SMS)/multimedia message service (MMS) and an e-mail service, an electronic notebook function, photographing, a broadcast player function, a video player function, a music player function, an Internet function, a messenger function, a game function, or a social media function.

In particular, an electronic device may include a plurality of camera modules having various focal lengths and/or angles of view to improve photographing functions. The plurality of camera modules may be fixed inside the electronic device in the form of a camera assembly by a supporting frame for supporting the plurality of camera modules.

The supporting frame may include a metal in consideration of heat resistance and strength.

SUMMARY

Provided are a camera assembly capable of preventing a short circuit between a camera module and a metallic supporting frame that surrounds the camera module, and an electronic device including the camera assembly.

Additional aspects will be set forth in part in the description which follows and, in part, will be apparent from the description, or may be learned by practice of the presented embodiments of the disclosure.

In accordance with an aspect of the disclosure, a camera assembly embedded in an electronic device may include a plurality of camera modules, and a supporting frame configured to support the plurality of camera modules. At least one of the plurality of camera modules may include a lens barrel, a lens driving assembly configured to move the lens barrel, a lens housing configured to accommodate the lens barrel and the lens driving assembly, a first circuit board on which an image sensor is provided, and a conductive connecting part configured to electrically connect the first circuit board and the lens driving assembly. The supporting frame may include a metal body configured to surround at least portions of edges of the lens housing, and a short-circuit prevention part provided on a surface of the metal body facing the conductive connecting part. The short-circuit prevention part may include a non-conductive material to block electrical contact between the metal body and the conductive connecting part.

A space is provided between the first circuit board and the supporting frame for exposing the conductive connecting part in a direction perpendicular to an optical axis direction.

The conductive connecting part may include an overlapping portion overlapping the supporting frame in the optical axis direction.

The overlapping portion may protrude outward beyond an edge of the lens housing.

The short-circuit prevention part may include a synthetic resin.

The first circuit board may include a plurality of first conductive regions electrically connected to the image sensor. A second circuit board may include a plurality of second conductive regions electrically connected to the lens driving assembly is provided on an inner surface of the lens housing. The conductive connecting part electrically connects the plurality of first conductive regions and the plurality of second conductive regions.

A length of the short-circuit prevention part is equal to or greater than a length of the conductive connecting part.

At least portions of surfaces of the short-circuit prevention part and the metal body facing each other have corresponding concavo-convex shapes.

The camera assembly may include an adhesive part configured to attach the lens barrel and the first circuit board and cover the conductive connecting part.

The short-circuit prevention part comprises an elastically-deformable material.

In accordance with an aspect of the disclosure, an electronic device may include a housing, and a camera assembly provided in the housing. The camera assembly may include a plurality of camera modules, and a supporting frame configured to support the plurality of camera modules. At least one of the plurality of camera modules may include a lens barrel, a lens driving assembly configured to move the lens barrel, a lens housing configured to accommodate the lens barrel and the lens driving assembly, a first circuit board on which an image sensor is provided, and a conductive connecting part configured to electrically connect the first circuit board and the lens driving assembly. The supporting frame may include a metal body configured to surround at least portions of edges of the lens housing, and a short-circuit prevention part provided on a surface of the metal body facing the conductive connecting part. The short-circuit prevention part may include a non-conductive material to block electrical contact between the metal body and the conductive connecting part.

A space is provided between the first circuit board and the supporting frame for exposing the conductive connecting part in a direction perpendicular to an optical axis direction.

The conductive connecting part may include an overlapping portion overlapping the supporting frame in the optical axis direction.

The overlapping portion may protrude outward beyond an edge of the lens housing.

The short-circuit prevention part may include a synthetic resin.

The first circuit board may include a plurality of first conductive regions electrically connected to the image sensor. A second circuit board may include a plurality of second conductive regions electrically connected to the lens driving assembly is provided on an inner surface of the lens housing. The conductive connecting part may electrically connect the plurality of first conductive regions and the plurality of second conductive regions.

A length of the short-circuit prevention part may be equal to or greater than a length of the conductive connecting part.

At least portions of surfaces of the short-circuit prevention part and the metal body facing each other may have corresponding concavo-convex shapes.

The electronic device may include an adhesive part fixing the lens barrel and the first circuit board and covering the conductive connecting part.

The short-circuit prevention part may include an elastically-deformable material.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
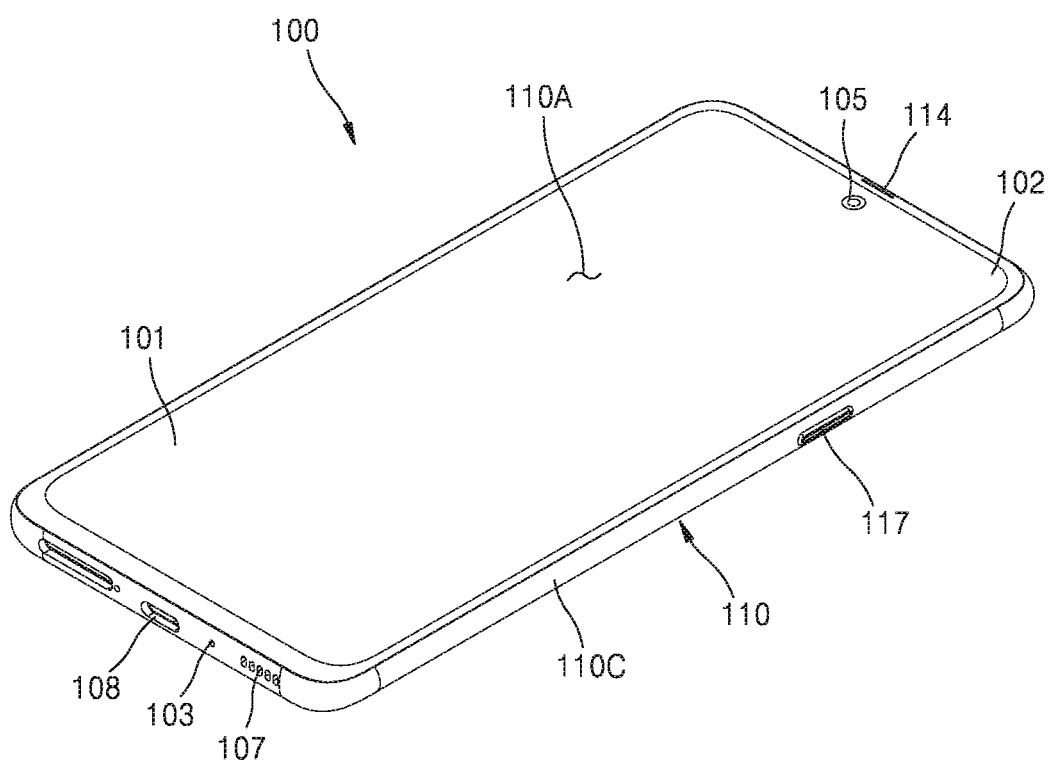
FIG. 1A is a front perspective view of an electronic device according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, with reference to the embodiments of the accompanying drawings, the configuration and operation of the disclosure will be described in detail.

The terms used in this specification will be briefly described, and the disclosure will be described in detail.

With respect to the terms in the various embodiments of the disclosure, the general terms which are currently and widely used are selected in consideration of functions of structural elements in the various embodiments of the disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the disclosure. Therefore, the terms used in the various embodiments of the disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements.

It will be understood that although the terms "first," "second," etc., may be used herein to describe various components, these components should not be limited by these terms. These terms are only used to distinguish one component from another.

Hereinafter, certain embodiments of the disclosure will be described in detail with reference to the accompanying drawings. The disclosure may, however, be embodied in many different forms and should not be construed as limited to the embodiments set forth herein. In order to clearly illustrate the disclosure, parts not related to the description are omitted, and like parts are denoted by like reference numerals throughout the specification.

Figure 1B:
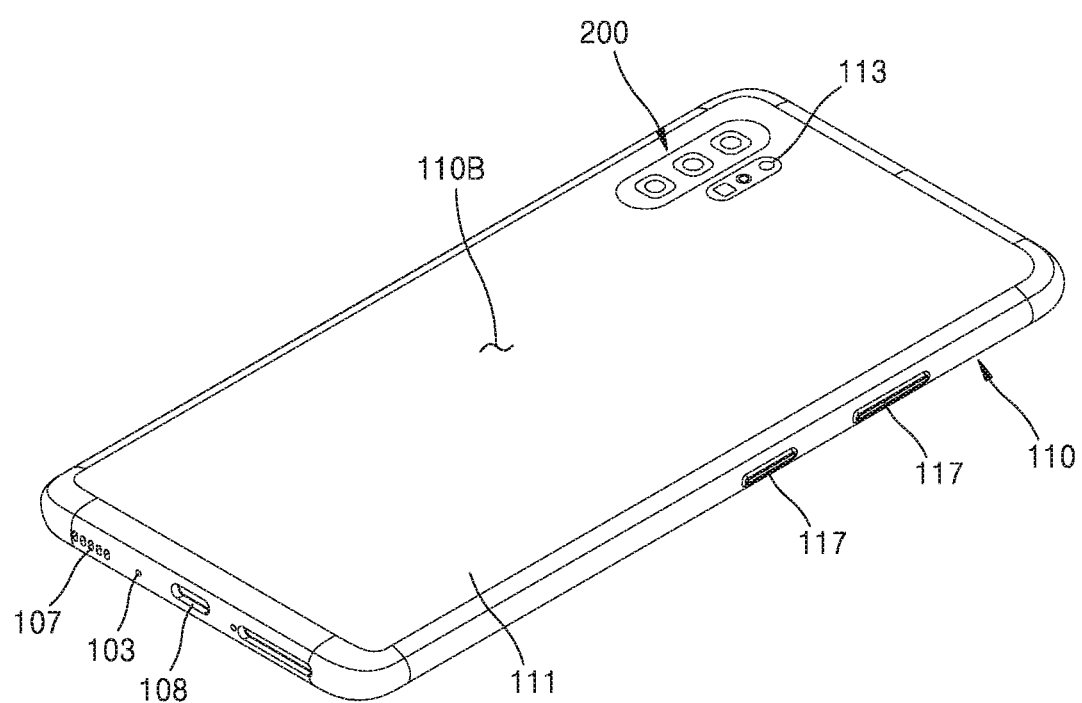
FIG. 1B is a rear perspective view of an electronic device according to an embodiment of the disclosure.
Figure 2:
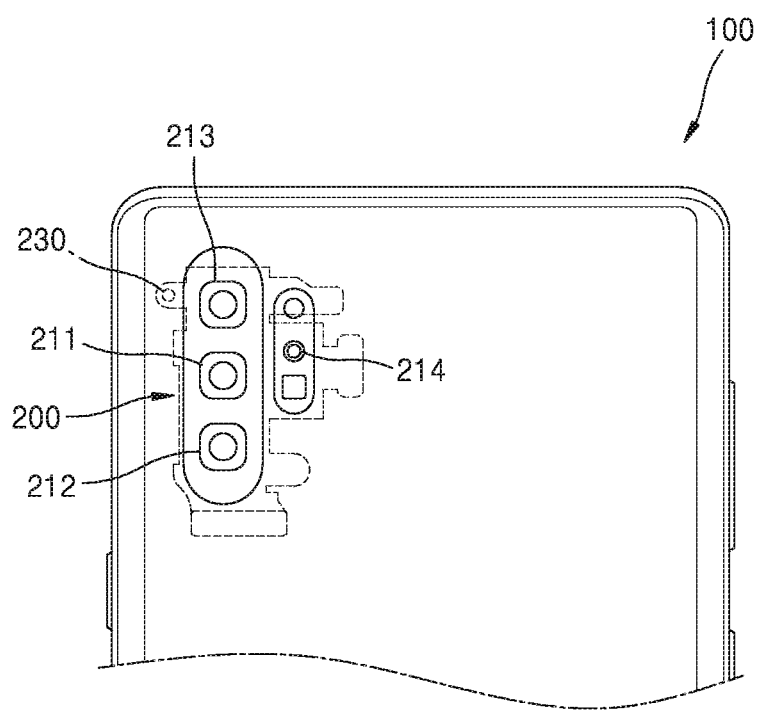
FIG. 2 is a diagram for describing a camera assembly in an electronic device according to an embodiment of the disclosure.

FIG. 1A is a front perspective view of an electronic device 100 according to an embodiment of the disclosure, FIG. 1B is a rear perspective view of an electronic device 100 according to an embodiment of the disclosure, and FIG. 2 is a diagram for describing a camera assembly in the electronic device 100 according to the embodiment of the disclosure.

Referring to FIGS. 1A, 1B, and 2, the electronic device 100 according to an embodiment of the disclosure may include a housing 110 having a first surface (or a front surface) 110A, a second surface (or a rear surface) 110B, and a side surface 110C surrounding the space between the first surface 110A and the second surface 110B. In another embodiment of the disclosure, the housing 110 may refer to a structure that constitutes portions of the first surface 110A, the second surface 110B, and the side surface 110C of FIGS. 1A and 1B.

According to an embodiment of the disclosure, the first surface 110A may be formed by a front plate 102 (e.g., a glass plate or a polymer plate including various coating layers) that includes at least a portion that is substantially transparent.

The second surface 110b may be formed by a rear cover 111 (or a cover) that is substantially opaque. The rear cover 111 may include, for example, a coated or colored glass, a ceramic, a polymer, a metal (e.g., aluminum, stainless steel (STS), or magnesium), or a combination of at least two of the foregoing materials.

For example, the rear cover 111 may include a ceramic. Ceramics are more impact-resistant than glass and may have greater anti-magnetic properties than metals. The rear cover 111 may be used with an electronic device including a 5G wireless system module. When a ceramic material is used to form the rear cover 111, more non-metallic regions may be obtained, thus being beneficial for 5G signal emission and facilitating implementation of a high sagging region to provide wider range of areas for transmission and reception of the 5G wireless system module.

The side surface 110C is coupled to the front plate 102 and the rear cover 111 and may be formed by a side surface bezel structure including a metal and/or a polymer. In some embodiments of the disclosure, the rear cover 111 and the side surface bezel structure may be formed as a single body and include the same material (e.g., a metal such as aluminum).

At least portions of the front plate 102 and the rear cover 111 may have a curved edge. For example, two first regions formed by a bent front plate 102 that seamlessly extends from the first surface 110A toward the rear cover 111 may be included in at least one end of long edges of the front plate 102. Two second regions formed by a bent rear cover 111 that seamlessly extends from the second surface 110B toward the front plate 102 may be included in at least one end of long edges of the rear cover 111.

According to an embodiment of the disclosure, the electronic device 100 may include at least one from among a display 101, audio modules 103, 107, and 114, a sensor module, camera assemblies 105, 200, and 113, a key input device 117, a light-emitting device, and a connector hole 108. In some embodiments of the disclosure, the electronic device 100 may omit at least one of the foregoing components (e.g., the key input device 117 or the light-emitting device) or additionally include other components.

The display 101 may be exposed through, for example, a substantial portion of the front plate 102. In some embodiments of the disclosure, at least a portion of the display 101 may be exposed through the front plate 102 forming the first surface 110A. In some embodiments of the disclosure, edges of the display 101 may be formed to have substantially the same shape as an adjacent outer edge shape of the front plate 102. In another embodiment of the disclosure, the display 101 and the front plate 102 may be formed such that distances between outer edges of the display 101 and outer edges of the front plate 102 are substantially constant to expand a region in which the display 101 is exposed.

In an embodiment of the disclosure, a recess or an opening may be formed in a portion of a screen display region of the display 101, and the electronic device 100 may include at least one of an audio module 114, the sensor module, and the light-emitting device aligned with the recess or the opening. In another embodiment of the disclosure, a rear surface of the screen display region of the display 101 may include at least one from among the audio module 114, the sensor module, a camera module 105, a fingerprint sensor, and the light-emitting device. In another embodiment of the disclosure, the display 101 may be coupled to or provided adjacent to a touch sensing circuit, a pressure sensor capable of measuring the intensity (pressure) of a touch, and/or a digitizer for detecting a magnetic field stylus pen.

The audio modules 103, 107, and 114 may include a microphone hole 103 and speaker holes 107 and 114. The microphone hole 103 may include a microphone for obtaining an external sound therein, and, in some embodiments of the disclosure, a plurality of microphones may be arranged in the microphone hole 103 to detect a direction of a sound. The speaker holes 107 and 114 may include an outside speaker hole 107 and a phone call receiver hole 114. In some embodiments of the disclosure, the speaker holes 107 and 114 and the microphone hole 103 may be implemented as a single hole, or a speaker may be included without the speaker holes 107 and 114 (e.g., a piezo speaker).

The sensor module may generate an electrical signal or a data value corresponding to an internal operating state of the electronic device 100 or an outside environmental state. For example, the sensor module may include a first sensor module (e.g., a proximity sensor) and/or a second sensor module (e.g., a fingerprint sensor) arranged on the first surface 110A of the housing 110 and/or a third sensor module (e.g., a heart rate monitor (HRM) sensor) and/or a fourth sensor module (e.g., a fingerprint sensor) arranged on the second surface 110B of the housing 110. The fingerprint sensor may be provided on at least one of the first surface 110A (e.g., the display 101) and the second surface 110B of the housing 110. The electronic device 100 may include a gesture sensor, a gyro sensor, an air pressure sensor, a magnetic sensor, an acceleration sensor, a grip sensor, a color sensor, an infrared ray (IR) sensor, a biometric sensor, a temperature sensor, a humidity sensor, an luminance sensor, and the like.

The key input device 117 may be provided on the side surface 110C of the housing 110. In another embodiment of the disclosure, the electronic device 100 may not include a portion of or the entire key input device 117 stated above, and the key input device 117 not included in the electronic device 100 may be implemented on the display 1010 in other forms such as a software key.

The light-emitting device may be provided, for example, on the first surface 110A of the housing 110. The light-emitting device may, for example, provide state information regarding the electronic device 100 in the form of light. In another embodiment of the disclosure, the light-emitting device may provide a light source that, for example, operates in conjunction with the operation of the camera module 105. The light-emitting devices may include, for example, an LED, an infrared (IR) LED, and a xenon lamp.

The connector hole 108 may include a first connector hole 108 capable of accommodating a connector (e.g., a universal serial bus (USB) connector) for transmitting and receiving power and/or data to and from an external electronic device, and/or a second connector hole (e.g., an earphone jack) capable of accommodating a connector for transmitting and receiving an audio signal to and from the external electronic device.

The electronic device 100 may include therein a main board, a battery, and a bracket supporting the main board and the bracket.

A processor, a memory, and/or an interface may be mounted on the main board. The processor may include, for example, one or more from among a central processing unit, an application processor, a graphics processing unit, an image signal processor, a sensor hub processor, and a communication processor.

The memory may include, for example, a volatile memory or a non-volatile memory.

The interface may include, for example, a high definition multimedia interface (HDMI), a USB interface, a secure digital (SD) card interface, and/or an audio interface. The interface may, for example, electrically or physically connect the electronic device 100 to an external electronic device and may include a USB connector, an SD card/MultiMediaCard (MMC) connector, or an audio connector.

The battery is a device for supplying power to at least one component of the electronic device 100 and may include, for example, a non-rechargeable primary battery, a rechargeable secondary battery, or a fuel cell. At least a portion of the battery may be, for example, provided on substantially the same plane as a printed circuit board. The battery may be integrally provided in the electronic device 100 or may be provided to be detachable from the electronic device 100.

An antenna may be provided between the rear cover 111 and the battery. The antenna may include, for example, a near field communication (NFC) antenna, a wireless charging antenna, and/or a magnetic secure transmission (MST) antenna. The antenna may, for example, perform a short-range communication with an external device or wirelessly transmit and receive power for charging. In another embodiment of the disclosure, the antenna structure may be formed by a portion of a side surface bezel structure 110C and/or the first supporting member or a combination of portions of the side surface bezel structure 110C and the first supporting member.

The camera assemblies 105, 200, and 113 may include a front-facing camera module 105, and a rear-facing camera assembly 200 and/or a flash 113 provided inside the housing 110. The flash 113 may include, for example, an LED or a xenon lamp.

Referring to FIG. 2, the camera assembly 200 may include a plurality of camera modules 211, 212, 213, and 214 having different functions from one another, and a supporting frame 230 for supporting the plurality of camera modules 211, 212, 213, and 214 inside the electronic device 100.

Figure 3:
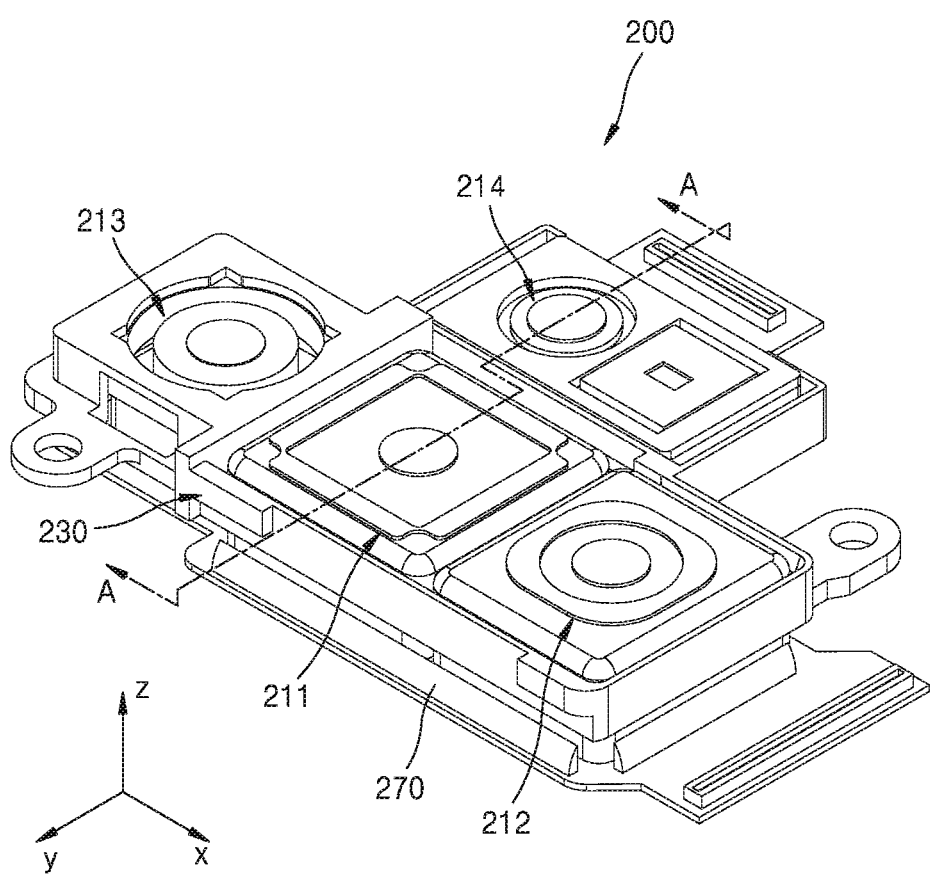
FIG. 3 is a perspective view of a camera assembly according to an example embodiment of the disclosure.
Figure 4:
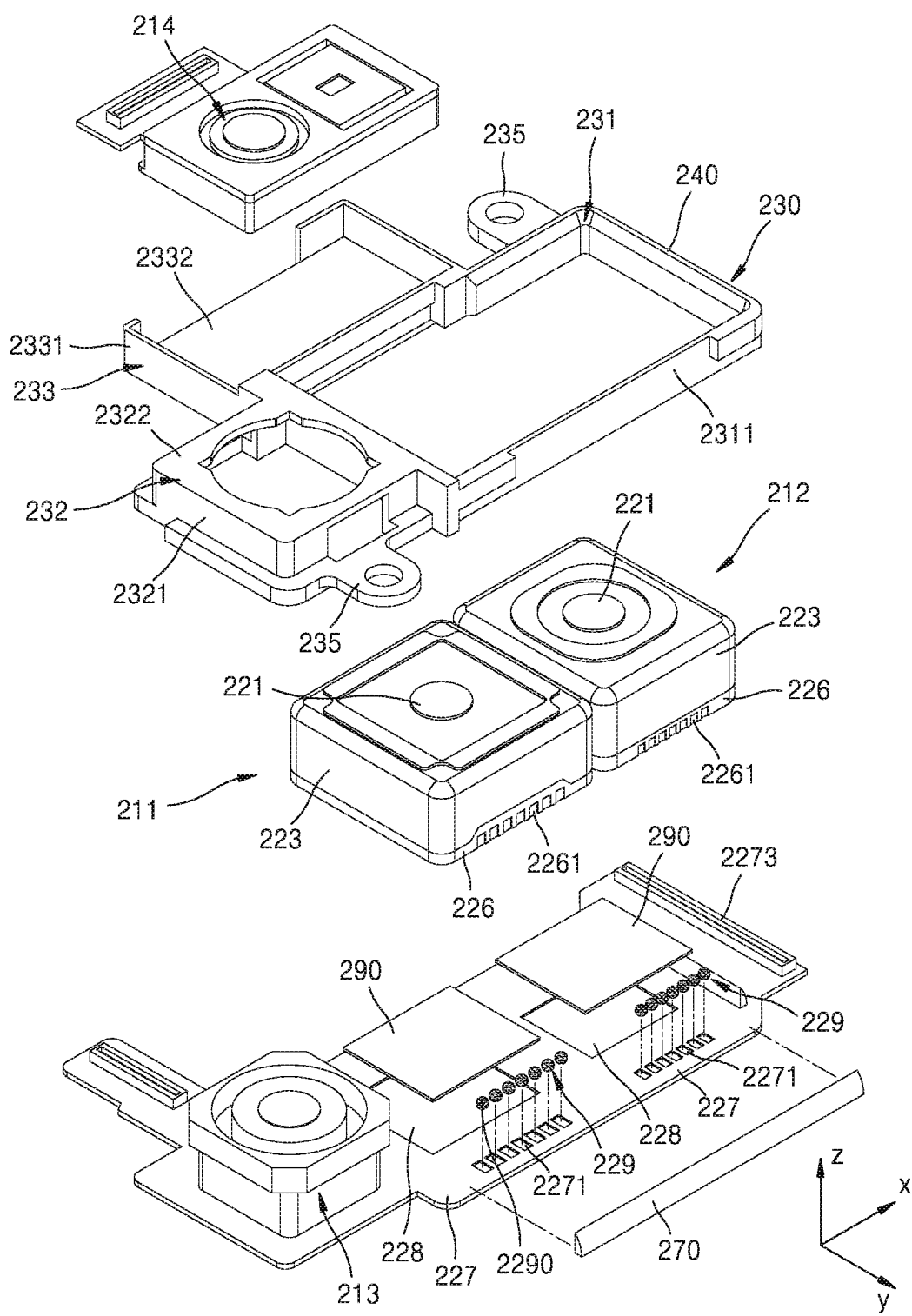
FIG. 4 is an exploded perspective view of the camera assembly of FIG. 3.
Figure 5:
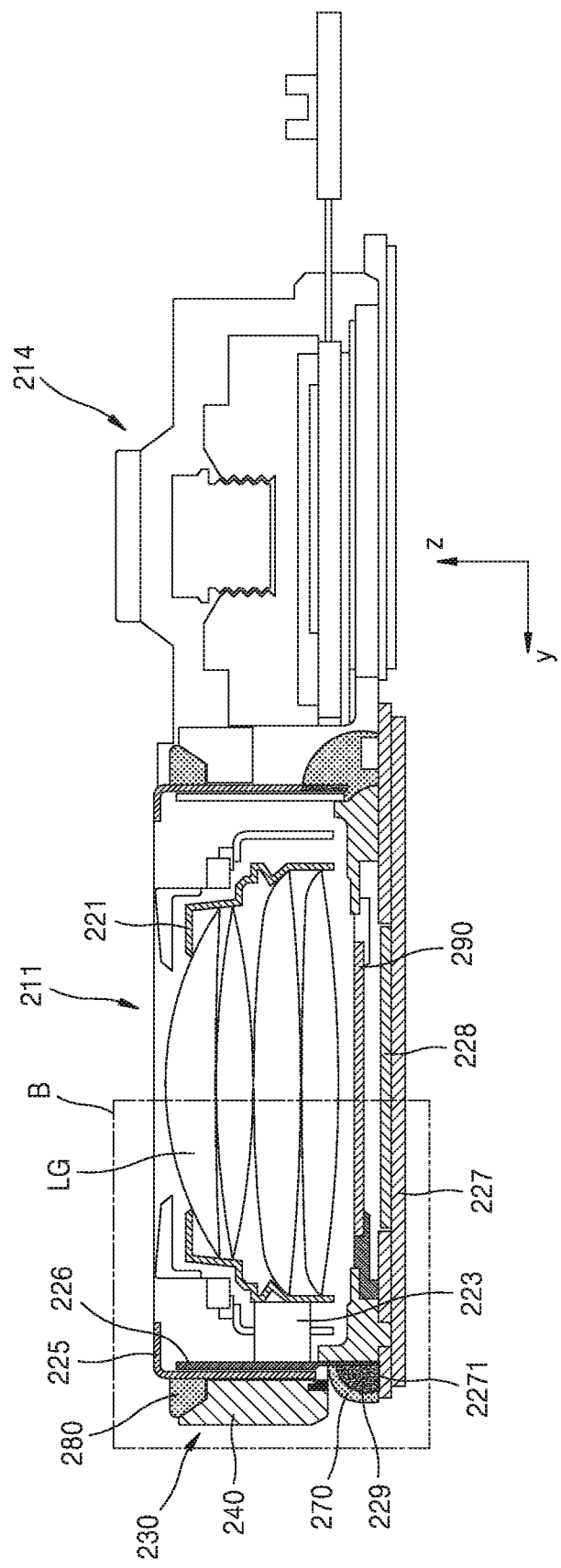
FIG. 5 is a cross-sectional view of the camera assembly of FIG. 3, taken along a line A-A.
Figure 6:
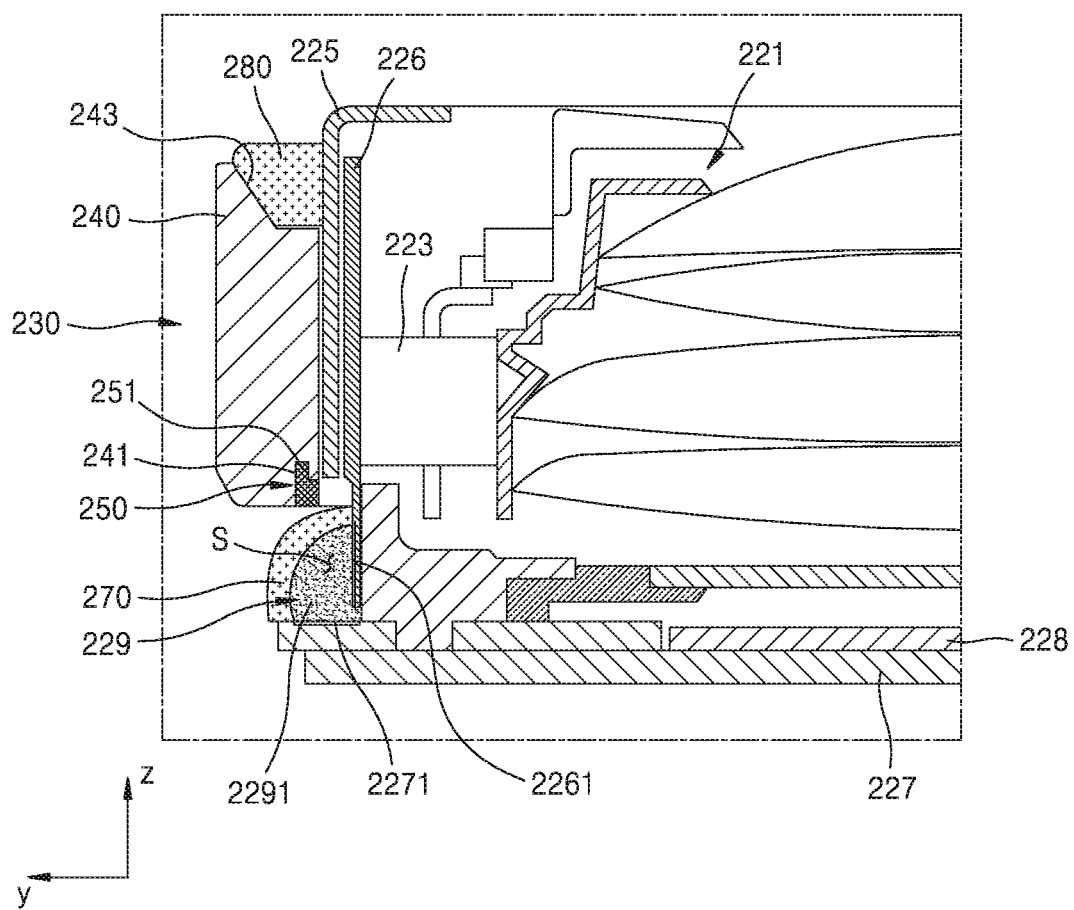
FIG. 6 is an enlarged view of a portion of FIG. 5.
Figure 7:
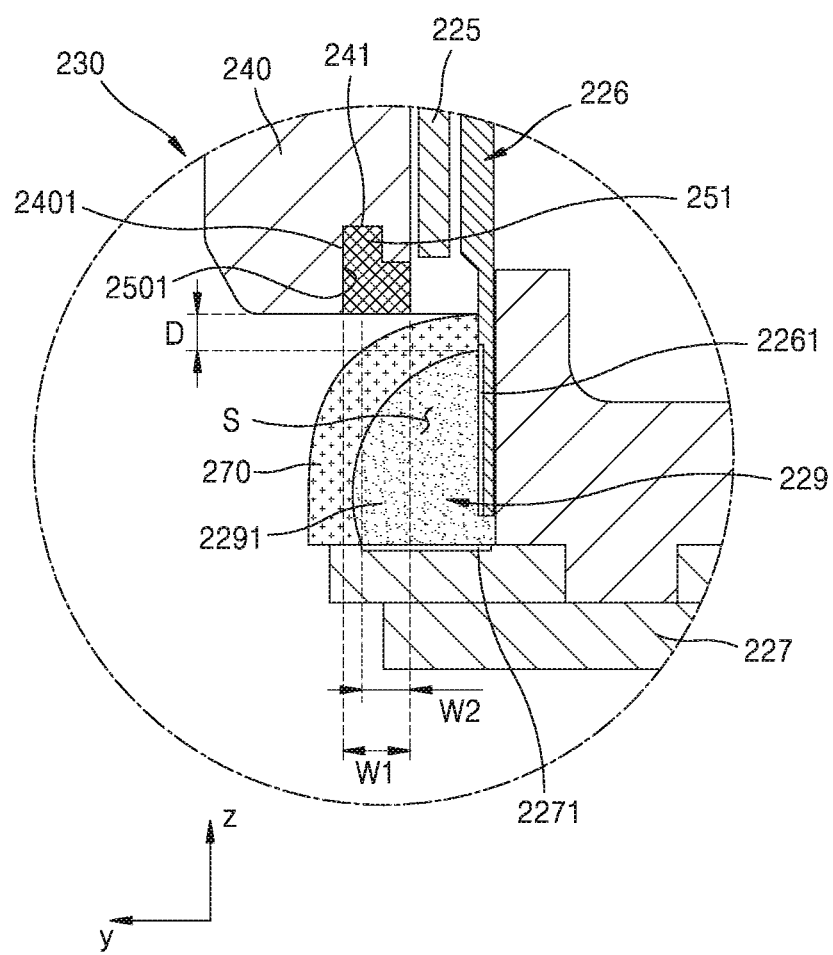
FIG. 7 is a diagram for describing a short-circuit preventing unit and a conductive connecting member in FIG. 6.
Figure 8:
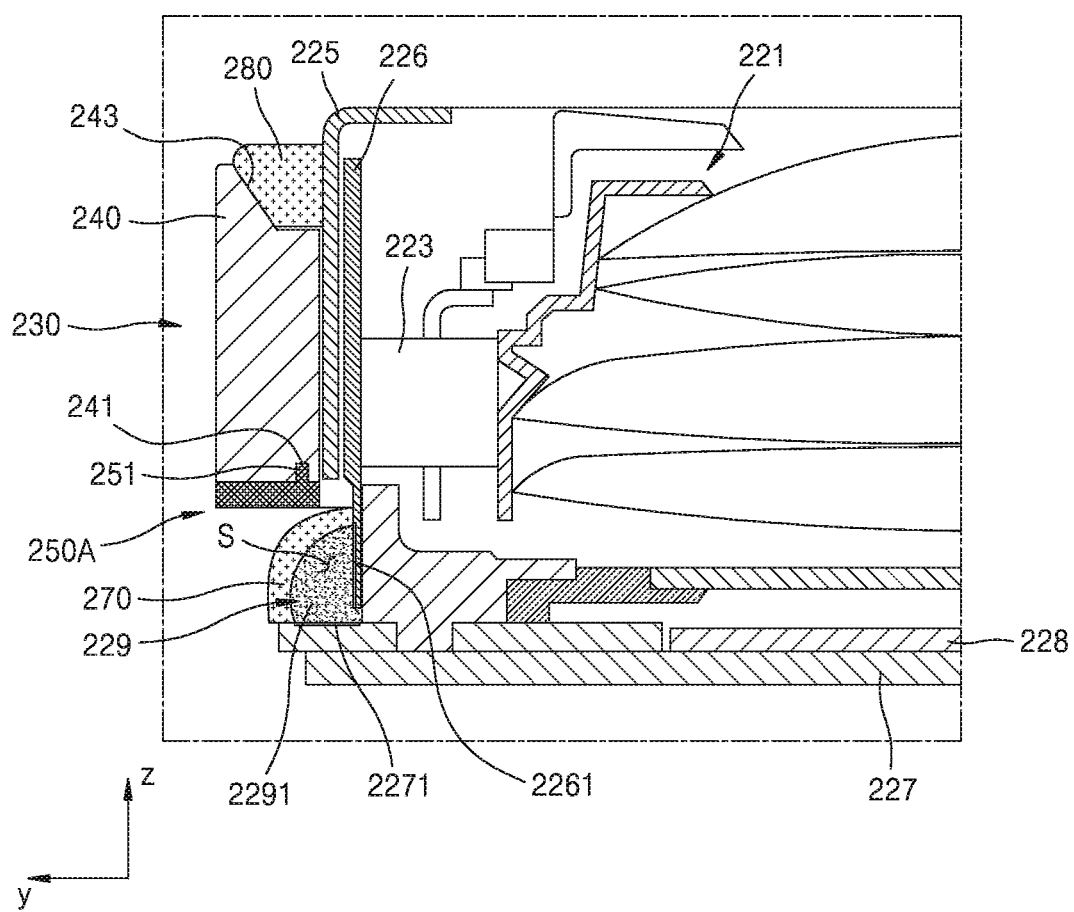
FIG. 8 is a diagram for describing another embodiment of the short-circuit preventing unit.
Figure 9:
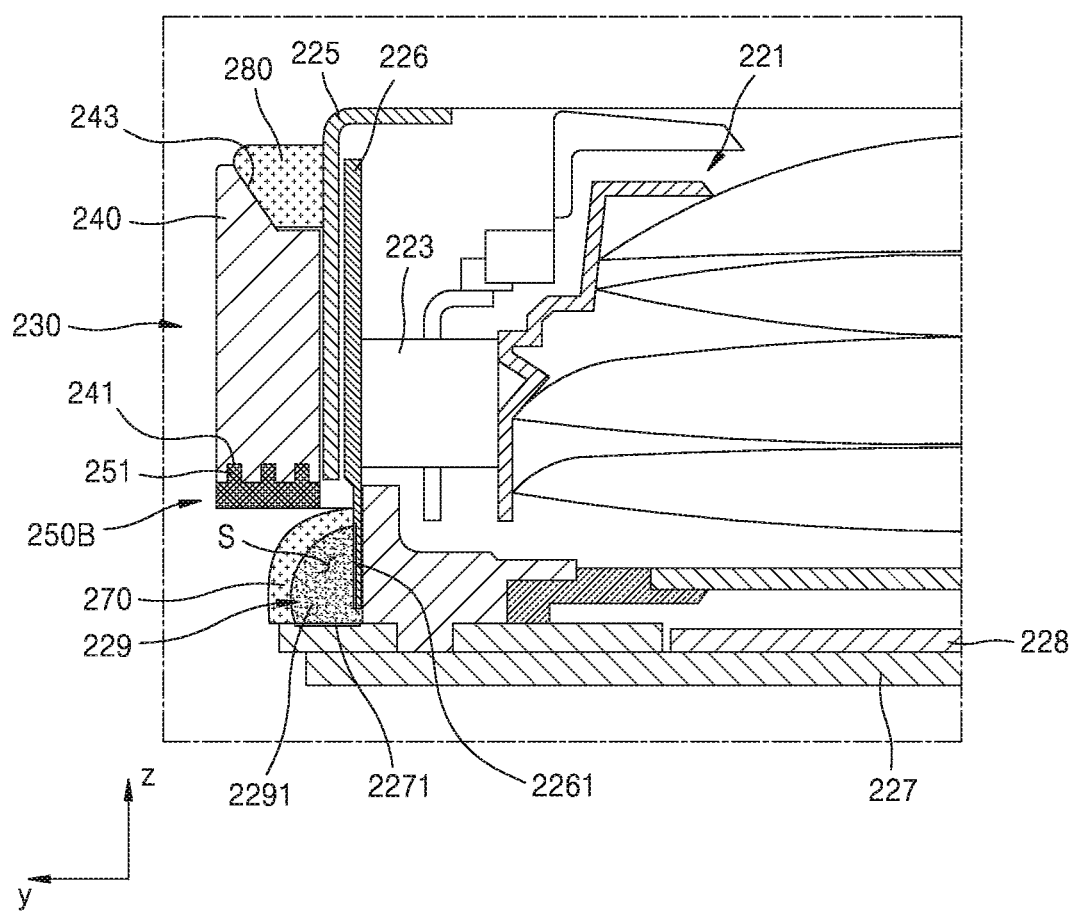
FIG. 9 is a diagram for describing another embodiment of the short-circuit preventing unit.
Figure 10:
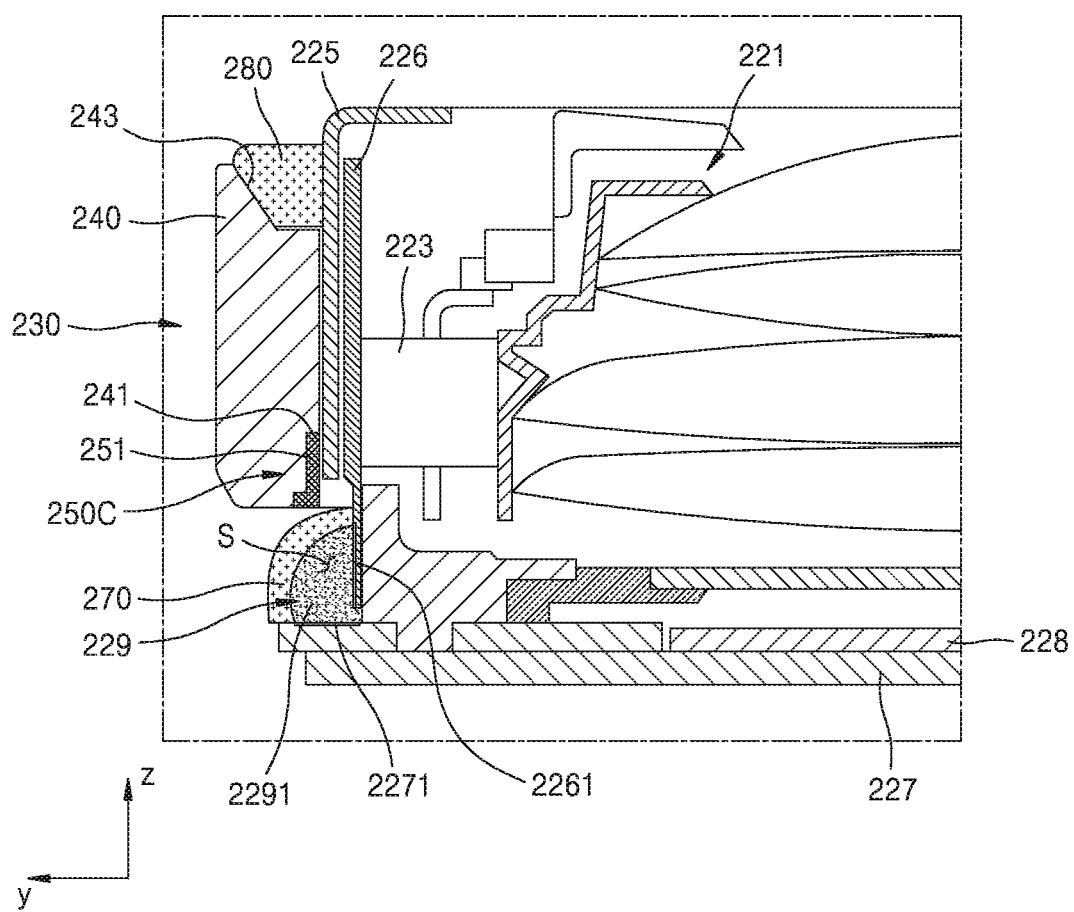
FIG. 10 is a diagram for describing another embodiment of the short-circuit prevention part.
Figure 11:
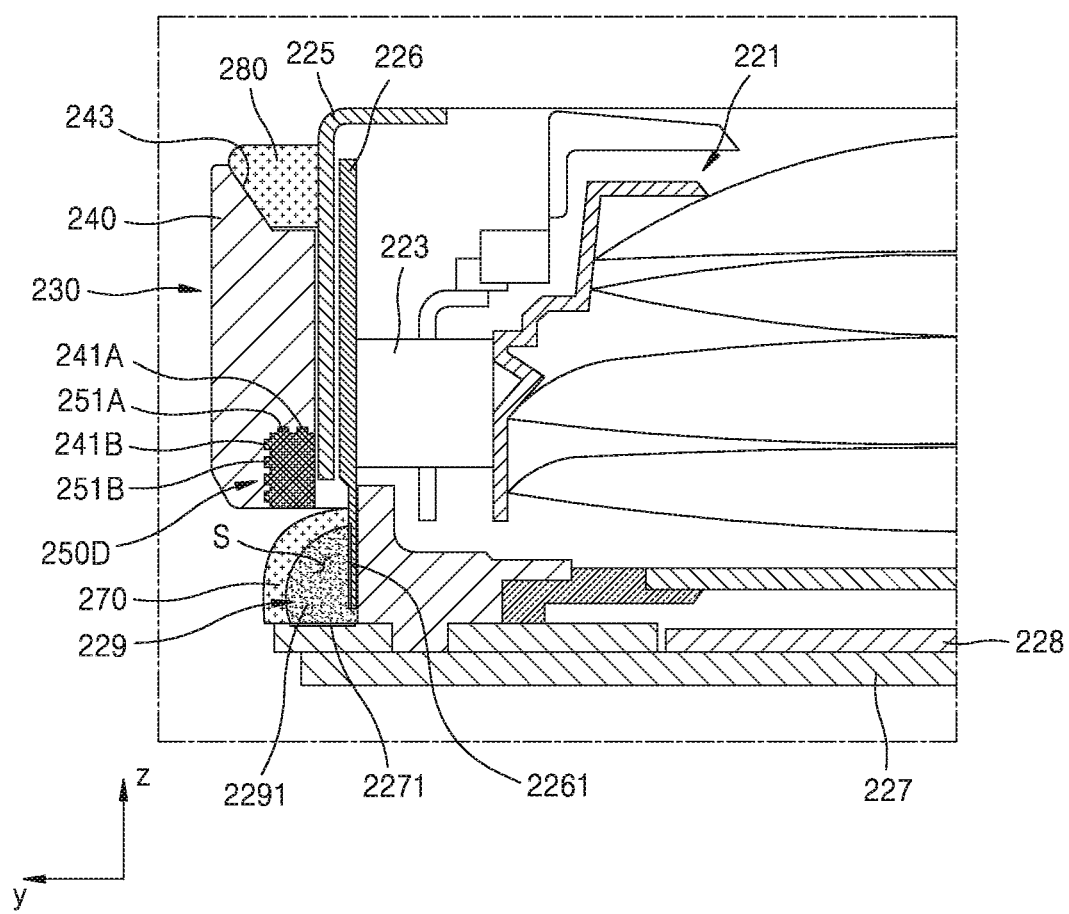
FIG. 11 is a diagram for describing another embodiment of the short-circuit prevention part.
Figure 12:
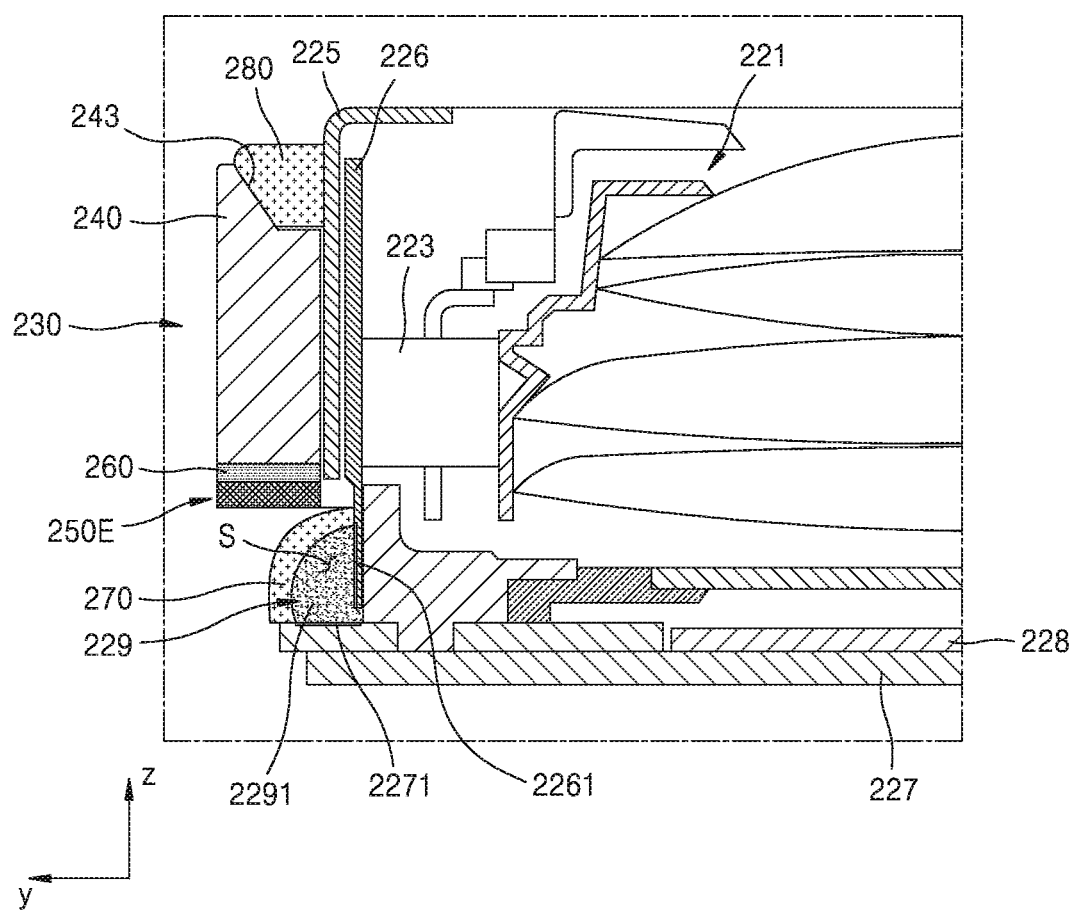
FIG. 12 is a diagram for describing another embodiment of the short-circuit prevention part.

FIG. 3 is a perspective view of the camera assembly 200 according to an embodiment of the disclosure, FIG. 4 is an exploded perspective view of the camera assembly 200 of FIG. 3, FIG. 5 is a cross-sectional view of the camera assembly 200 of FIG. 3, taken along a line A-A, FIG. 6 is an enlarged view of a portion B of FIG. 5, and FIG. 7 is a diagram for describing a short-circuit prevention part 250 and a conductive connecting part 229 of FIG. 6. FIG. 8 is a diagram for describing short-circuit prevention part 250A according to another embodiment of the disclosure, FIG. 9 is a diagram for describing short-circuit prevention part 250B according to another embodiment of the disclosure, FIG. 10 is a diagram for describing short-circuit prevention part 250C according to another embodiment of the disclosure, FIG. 11 is a diagram for describing short-circuit prevention part 250D according to another embodiment of the disclosure, and FIG. 12 is a diagram for describing short-circuit prevention part 250E according to another embodiment of the disclosure.

Referring to FIGS. 3 and 4, the camera assembly 200 may include the plurality of camera modules 211, 212, 213, and 214, and the supporting frame 230 for supporting the plurality of camera modules 211, 212, 213, and 214.

The plurality of camera modules 211, 212, 213, and 214 may include a first camera module 211, a second camera module 212, a third camera module 213, and a fourth camera module 214. The number of the plurality of camera modules 211, 212, 213, and 214 is not limited thereto, and may be two, three, five, etc.

The plurality of camera modules 211, 212, 213, and 214 may have different functions from one another. For example, the first camera module 211 may be configured to capture wide-angle images, and the second camera module 212 may be configured to capture telephoto images. The third camera module 213 may be configured to capture ultra wide-angle images with an angle of view larger than the first camera module 211. The fourth camera module 214 may be configured to capture depth images and may be referred to as a time of flight (TOF) camera.

At least one of the plurality of camera modules 211, 212, 213, and 214 may have an auto focus function and a shake correction function. For example, the first camera module 211 and the second camera module 212 may have the auto focus function and the shake correction function.

The angle of view of the first camera module 211 may be larger than that of the second camera module 212. The focal length of the first camera module 211 may be smaller than the focal length of the second camera module 212.

At least one camera module from among the plurality of camera modules 211, 212, 213, and 214 may include a lens barrel 221 supporting a lens group LG, a lens driving assembly 223 that moves the lens barrel 221 in an optical axis direction (z direction) or directions (x and y directions) perpendicular to the optical axis direction (z direction), a lens housing 225 that accommodates the lens barrel 221 and the lens driving assembly 223, a first circuit board 227 having mounted thereon an image sensor 228 that is located apart from the lens group LG in the optical axis direction (z direction), and a conductive connecting part 229 that electrically connects the first circuit board 227 and the lens driving assembly 223.

For example, first and second camera modules 211 and 212 may each include the lens barrel 221, the lens driving assembly 223, the lens housing 225, the first circuit board 227, and the conductive connecting part 229. An IR filter 290 may be provided between the lens barrel 221 and the image sensor 228.

The first circuit board 227 of the first camera module 211 and the first circuit board 227 of the second camera module 212 may be a single body. However, the disclosure is not limited thereto, and the first circuit board 227 of the first camera module 211 and the first circuit board 227 may be separate bodies.

The first circuit board 227 includes at least one first conductive region 2271 electrically connected to the image sensor 228. The first conductive region 2271 may be a conductive pad.

The first conductive region 2271 may be a plurality of first conductive regions 2271 arranged to be apart from one another. However, the disclosure is not limited thereto, and only a single first conductive region 2271 may be provided.

The first circuit board 227 may be provided with a connector 2273 for electrical connection to other components. The connector 2273 may be connected to a main board or a display.

The first circuit board 227 may be a printed circuit board. For example, the first circuit board 227 may be a non-bending printed circuit board or a flexible printed circuit board.

Referring to FIGS. 4, 5, and 6, a second circuit board 226 may be provided on an inner surface of the lens housing 225. The second circuit board 226 may include a second conductive region 2261 electrically connected to the lens driving assembly 223. The second conductive region 2261 may be a conductive pad.

The second circuit board 226 processes a driving signal and provides power to the lens driving assembly 223.

The second conductive region 2261 may be a plurality of second conductive regions 2261 arranged to be apart from one another. However, the disclosure is not limited thereto, and only a single second conductive region 2261 may be provided.

The lens driving assembly 223 may include a voice coil motor. For example, the lens driving assembly 223 may include a driving coil that provides a driving force for moving a magnet provided in the lens barrel 221. The second conductive region 2261 may be electrically connected to the driving coil.

However, the lens driving assembly 223 is not limited to the voice coil motor and may include other driving mechanisms, such as a step motor and an ultrasonic motor.

The second conductive region 2261 may be provided to face the outside of the first and second camera modules 211 and 212. The second conductive region 2261 may not overlap the lens housing 225 in the directions (x and y directions) perpendicular to the optical axis direction (z direction). Therefore, the second conductive region 2261 may be exposed without being covered by the lens housing 225.

The conductive connecting part 229 electrically connects the first conductive region 2271 and the second conductive region 2261. Through the conductive connecting part 229, power or electrical signals may be transmitted between the first circuit board 227 and the second circuit board 226.

The conductive connecting part 229 may be formed by soldering. The conductive connecting part 229 may include a plurality of solder balls 2290 that individually connect a plurality of first conductive regions 2271 and a plurality of second conductive regions 2261.

However, a method of forming the conductive connecting part 229 is not limited thereto, and the conductive connecting part 229 may be formed by using a conductive adhesive material. As an example of the conductive adhesive material, an anisotropic conductive film may be used. However, the conductive adhesive material is not limited thereto and may vary as necessary as long as the conductive adhesive material has conductivity and adhesiveness.

The supporting frame 230 supports at least portions of edges of the plurality of camera modules 211, 212, 213, and 214, thereby preventing the plurality of camera modules 211, 212, 213, and 214 from being shaken in the directions (x and y directions) perpendicular to the optical axis direction (z direction).

For example, the supporting frame 230 includes a first supporting portion 231 that surrounds edges of a first camera module 211 and a second camera module 212, a second supporting portion 232 that surrounds portions of edges of a third camera module 213 and covers a portion of the top surface of the third camera module 213, and a third supporting portion 233 that surrounds portions of edges of a fourth camera module 214. However, the shape of the supporting frame 230 is not limited thereto and may be variously modified as long as the shape of the supporting frame 230 supports the plurality of camera modules 211, 212, 213, and 214.

The first supporting portion 231 includes a first sidewall 2311 that covers portions of the edges of the first camera module 211 and the second camera module 212 that are arranged adjacent to each other. The second supporting portion 232 includes a second sidewall 2321 that covers portions of the edges of the third camera module 213 and an upper wall 2232 that covers a portion of the top surface of the third camera module 213. The third supporting portion 233 includes a third sidewall 2331 that covers portions of the edges of the fourth camera module 214 and a lower wall 2332 that covers the bottom surface of the fourth camera module 214.

A portion of the first sidewall 2311 may form a single body with a portion of the second sidewall 2321, and the other portion of the first sidewall 2311 may form a single body with a portion of the third sidewall 2331. Therefore, a portion of the first sidewall 2311 that faces the third camera module 213 functions as a portion of the second sidewall 2231, and a portion of the first sidewall 2311 that faces the fourth camera module 214 functions as a portion of the third sidewall 2331.

By the supporting frame 230, the camera assembly 200 may be assembled to other components of the electronic device 100. For example, by inserting fastening members into a plurality of fastening holes 235 of the supporting frame 230, the camera assembly 200 supported by the supporting frame 230 may be assembled to a main board or the housing 110.

The supporting frame 230 includes a metal body 240 surrounding at least some of edges of the lens housing 225.

The metal body 240 may include a metal. For example, the metal body 240 may include aluminum or stainless steel. However, the material constituting the metal body 240 is not limited thereto, and various materials may be used as long as it is a metal for preventing deformation of the camera assembly 200.

When the metal body 240 is not a metal component, it may be easily deformed by heat or impact. In contrast, as the metal body 240 of the supporting frame 230 according to the embodiment of the disclosure is a metal component, the camera assembly 200 may be stably supported in various environments exposed to heat or external shock.

As high camera performance is demanded for the electronic device 100, the size of the camera assembly 200 is gradually increasing. However, due to the demand for miniaturization of the electronic device 100, it is beneficial to reduce the size of the camera assembly 200, which is an internal component of the electronic device 100, as much as possible.

To satisfy the two contradictory demands for the camera assembly 200, the sizes of components other than a camera module, which is a configuration for the core function of the camera performance, may be reduced. For example, a space occupied by the supporting frame 230 supporting the plurality of camera modules 211, 212, 213, and 214 may be reduced in the camera assembly 200.

For example, as shown in FIG. 6, a predetermined space S may be secured through a structure that separates the supporting frame 230 from the first circuit board 227, and the conductive connecting part 229 may be placed in the space S to overlap the supporting frame 230 in the optical axis direction (z direction).

When the conductive connecting part 229 is not placed to overlap the supporting frame 230 in the optical axis direction (z direction), to prevent a short circuit between the conductive connecting part 229 and the supporting frame 230, it may be considered to place the conductive connecting part 229 to be apart from the inner surfaces of the supporting frame 230 in the directions (x and y directions) perpendicular to the optical axis direction (z direction). However, in this case, the size of the camera assembly 200 may be increased in the directions (x and y directions) perpendicular to the optical axis direction (z direction).

In contrast, in the camera assembly 200 according to an embodiment of the disclosure, the conductive connecting part 229 is placed to overlap the supporting frame 230 in the optical axis direction (z direction), and thus the camera assembly 200 might not require a separate space in the directions (x and y directions) perpendicular to the optical axis direction (z direction) for placing the conductive connecting part 229 therein. Therefore, the size of the camera assembly 200 may be reduced in the directions (x and y directions) perpendicular to the optical axis direction (z direction).

The space S for exposing the conductive connecting part 229 in the directions (x and y directions) perpendicular to the optical axis direction (z direction) may be formed or provided between the supporting frame 230 and the first circuit board 227.

Referring to FIG. 7, the conductive connecting part 229 may have an overlapping portion 2291 that overlaps the supporting frame 230 in the optical axis direction (z direction). The overlapping portion 2291 may protrude outward beyond the edge of the lens housing 225. The overlapping portion 2291 may protrude outward beyond the edge of the lens housing 225 in the directions (x and y directions) perpendicular to the optical axis direction (z direction).

However, in such a process for reducing spaces occupied by the supporting frame 230 and the conductive connecting part 229, a distance D between the supporting frame 230 and the conductive connecting part 229 may be reduced. For example, the distance D between the supporting frame 230 and the conductive connecting part 229 in a direction parallel to the optical axis direction may be 1 mm or less.

As the distance D between the metal body 240 and the conductive connecting part 229 is reduced, when an external shock is applied, the metal body 240 and the conductive connecting part 229 may contact each other. Because both the metal body 240 and the conductive connecting part 229 are metal components, an unintended short circuit may occur between the conductive connecting part 229 and the metal body 240.

In the camera assembly 200 according to an embodiment of the disclosure, the supporting frame 230 may further include the short-circuit prevention part 250 configured to prevent a short circuit between the metal body 240 and the conductive connecting part 229.

The short-circuit prevention part 250 includes a non-conductive material to block electrical contact between the metal body 240 and the conductive connecting part 229. The short-circuit prevention part 250 may include a heat-resistant material. For example, the short-circuit prevention part 250 may include a material having heat resistance to a temperature of at least 80° C.

For example, the short-circuit prevention part 250 may include a synthetic resin. For example, the short-circuit prevention part 250 may include a polymer plastic or a silicone resin. However, the material constituting the short-circuit prevention part 250 is not limited thereto, and other materials may be included as long as it is a non-conductive material.

The short-circuit prevention part 250 is provided on a surface 2401 of the metal body 240 facing the conductive connecting part 229.

Because the conductive connecting part 229 is a component for electrically connecting the first circuit board 227 provided at a relative low position to the lens driving assembly 223, the conductive connecting part 229 is located below a camera module. Therefore, at least a portion of the short-circuit prevention part 250 is provided below the metal body 240.

For example, the short-circuit prevention part 250 may be provided on a portion of a bottom surface of the metal body 240 and a portion of an inner surface of the metal body 240 facing the lens housing 225.

A width W1 of the short-circuit prevention part 250 may be equal to or greater than a width W2 of the overlapping portion 2291. For example, the width W1 of the short-circuit prevention part 250 may be designed to be slightly greater than the width W2 of the overlapping portion 2291 in consideration of a tolerance. For example, a difference between the width W1 of the short-circuit prevention part 250 and the width W2 of the overlapping portion 2291 may be less than 0.1 mm. However, the width W1 of the short-circuit prevention part 250 is not limited thereto, and the width W1 of the short-circuit prevention part 250 may be from two to five times the width W2 of the overlapping portion 2291.

To improve the coupling between the short-circuit prevention part 250 and the metal body 240, the surface 2401 of the metal body 240 and a surface 2501 of the short-circuit prevention part 250 facing each other may have shapes corresponding to each other.

For example, at least portions of surfaces 2401 and 2501 of the metal body 240 and the short-circuit prevention part 250 facing each other may have concavo-convex shapes corresponding to each other. For example, the short-circuit prevention part 250 may have a convex portion 251 protruding in the optical axis direction (z direction), and the metal body 240 may have a concave portion 241 corresponding to the convex portion 251.

However, the arrangement and the shapes of the short-circuit prevention part 250 and the metal body 240 are not limited thereto, and various modifications may be made therein.

For example, as shown in FIG. 8, a short-circuit prevention part 250A may be provided on the bottom surface of the metal body 240 and have a single convex portion 251, and the metal body 240 may have a single concave portion 241 corresponding to the single convex portion 251.

In another example, as shown in FIG. 9, a short-circuit prevention part 250B may be provided on the bottom surface of the metal body 240 and have a plurality of convex portions 251, and the metal body 240 may have a plurality of concave portions 241 corresponding to the plurality of convex portions 251.

In another example, as shown in FIG. 10, a short-circuit prevention part 250C may be provided at an edge portion at which the bottom surface and the inner surface of the metal body 240 are connected to each other and may have an L shape, and the metal body 240 may have the concave portion 241 having a shape corresponding to that of the short-circuit prevention part 250.

In another example, as shown in FIG. 11, a short-circuit prevention part 250D may be provided at an edge portion at which the bottom surface and the inner surface of the metal body 240 are connected to each other and have convex portions 251A and 215B protruding in the optical axis direction (z direction) and the directions (x and y directions) perpendicular to the optical axis direction (z direction), and the metal body 240 may have concave portions 241A and 241B having shapes corresponding to that of the short-circuit prevention part 250.

The above-described embodiments of the disclosure have been described for cases where convex portions 251 and concave portions 241 formed at short-circuit prevention parts 250, 250A, 250B, 250C, and 250D are cosmetically conspicuous. However, the convex portion 251 and the concave portion 241 formed at the short-circuit prevention part 250 and the metal body 240 may have fine concavo-convex shapes that are not cosmetically conspicuous.

For example, a surface of the metal body 240 facing the short-circuit prevention part 250 may have a certain roughness, and the roughness of a surface of the short-circuit prevention part 250 facing the metal body 240 may correspond to the roughness of the surface of the metal body 240 facing the short-circuit prevention part 250. The roughness of the surface of the metal body 240 facing the short-circuit prevention part 250 may be formed through a chemical treatment.

However, the shapes of the surfaces of the metal body 240 and the short-circuit prevention part 250 facing each other are not limited to concavo-convex shapes corresponding to each other. For example, as shown in FIG. 12, the bottom surface of the metal body 240 may have a planar shape, and the short-circuit prevention part 250E may have a flat film-like shape in correspondence to the bottom surface of the metal body 240. At least one of the surfaces of the metal body 240 and the short-circuit prevention part 250 facing each other may be treated by using a surface modification method using plasma, for example. For example, the surface of the metal body 240 may be treated by using a surface modification treatment method using plasma.

The short-circuit prevention part 250 described above may be attached to the metal body 240 in various ways. For example, the short-circuit prevention part 250 may be attached to the metal body 240 through insert-molding, without a separate adhesive layer. In another example, as shown in FIG. 12, the short-circuit prevention part 250 may be attached to the metal body 240 through a separate adhesive layer 260.

Figure 13:
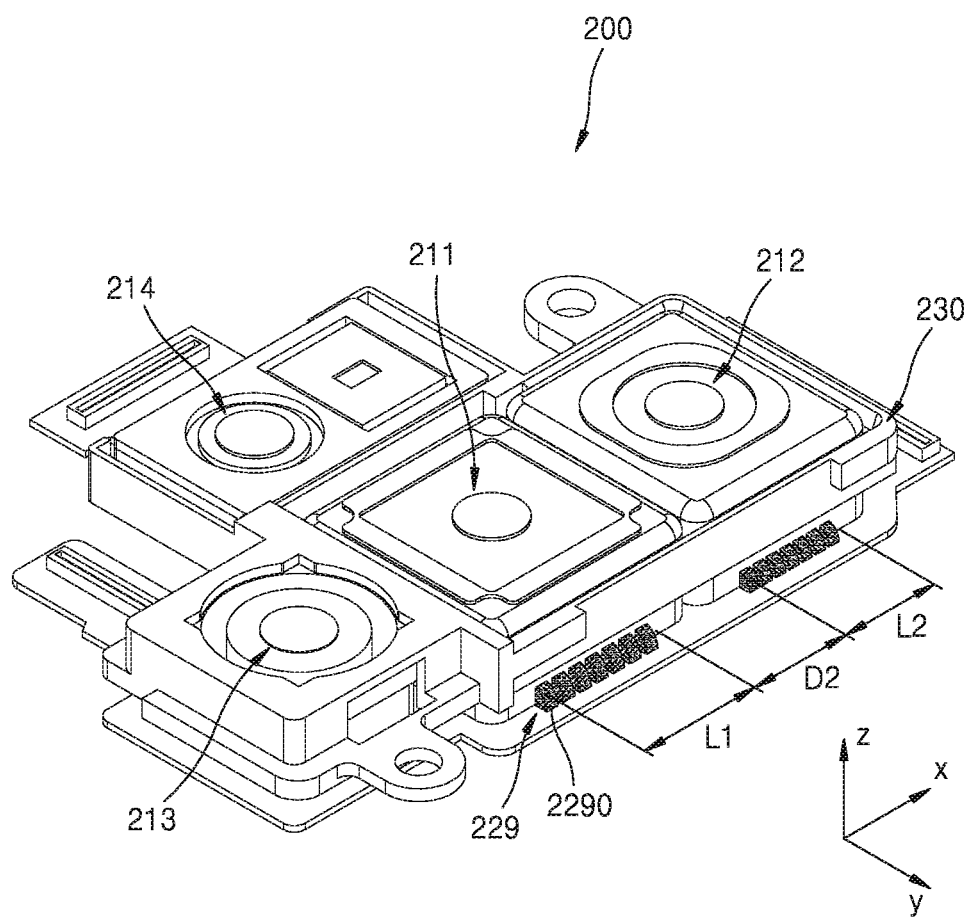
FIG. 13 is a perspective view of a portion of the camera assembly of FIG. 3 viewed from another angle.
Figure 14:
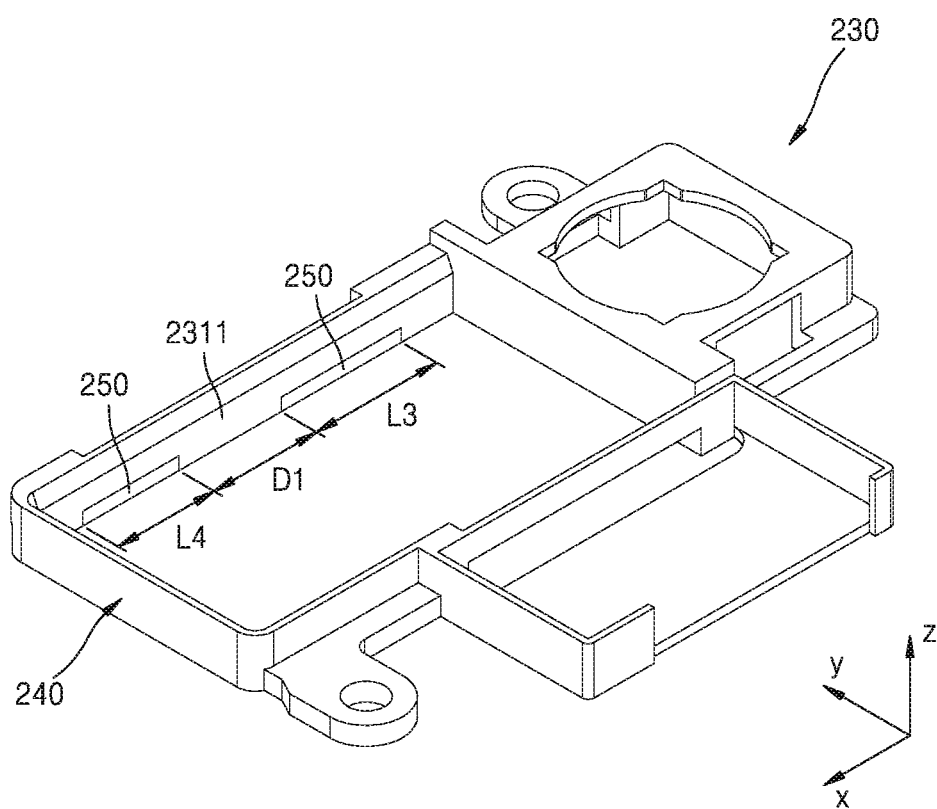
FIG. 14 is a perspective view of the supporting frame of FIG. 3 viewed from another angle.
Figure 15:
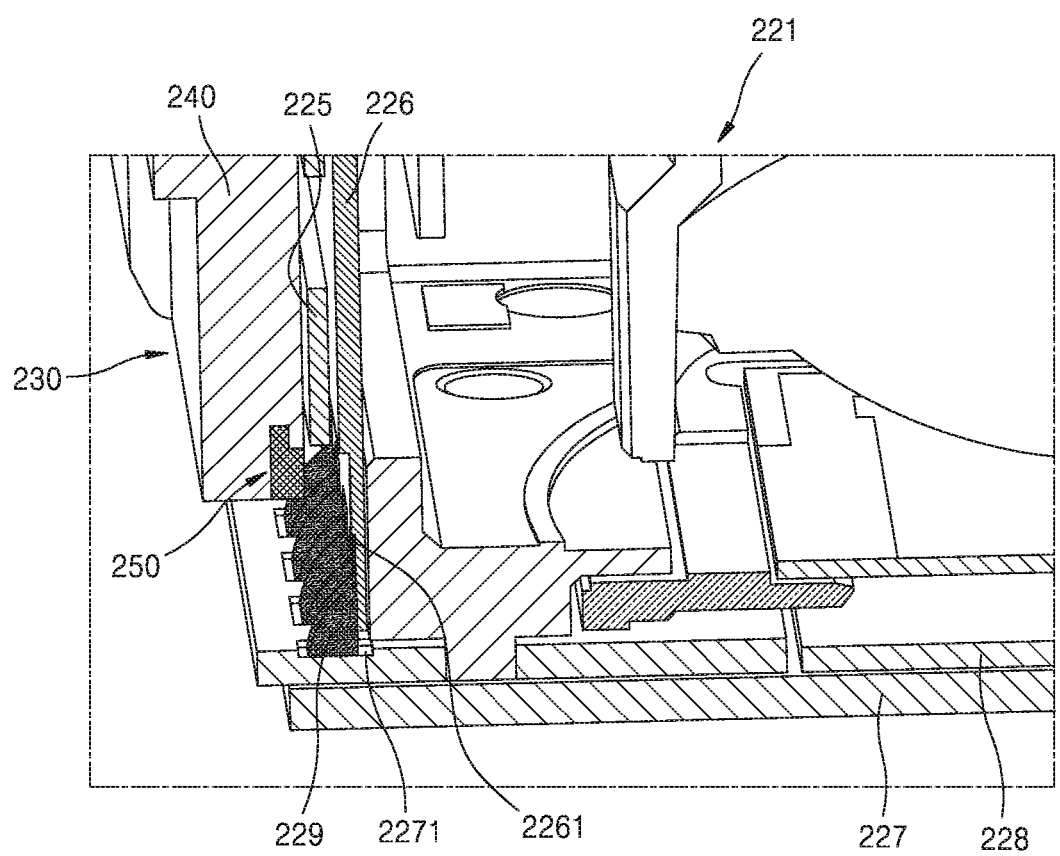
FIG. 15 is a partially exploded perspective view of a portion of the camera assembly of FIG. 3.
Figure 16:
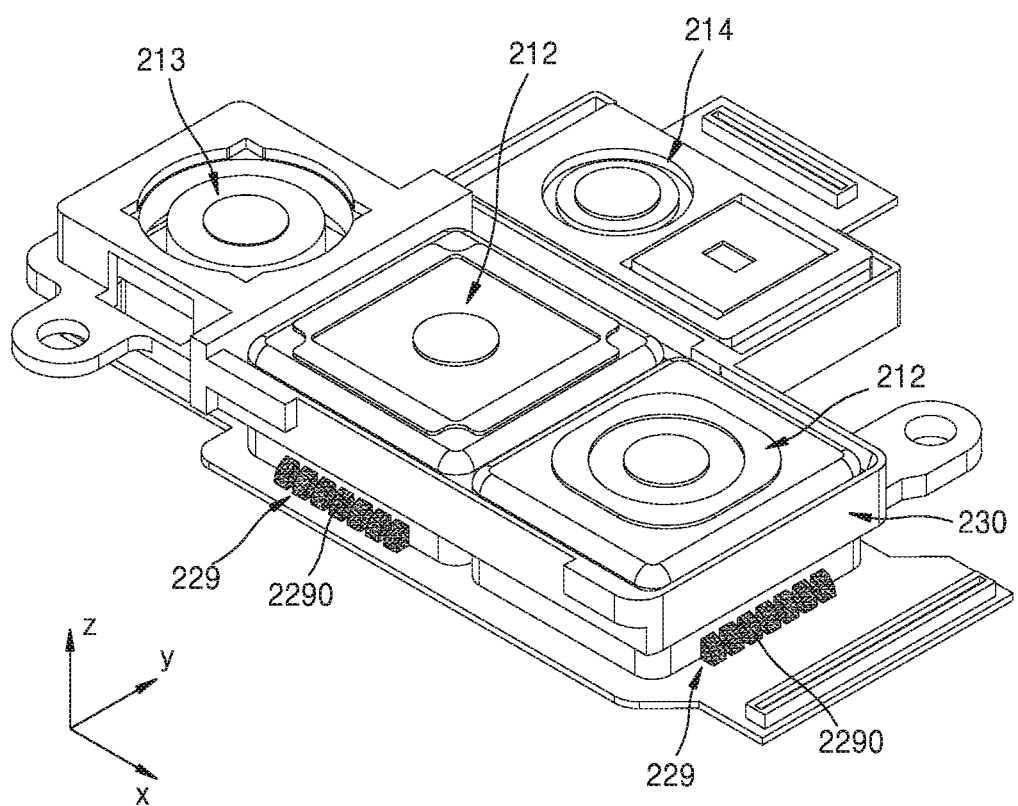
FIG. 16 is a perspective view of a camera assembly according to another embodiment of the disclosure.
Figure 17:
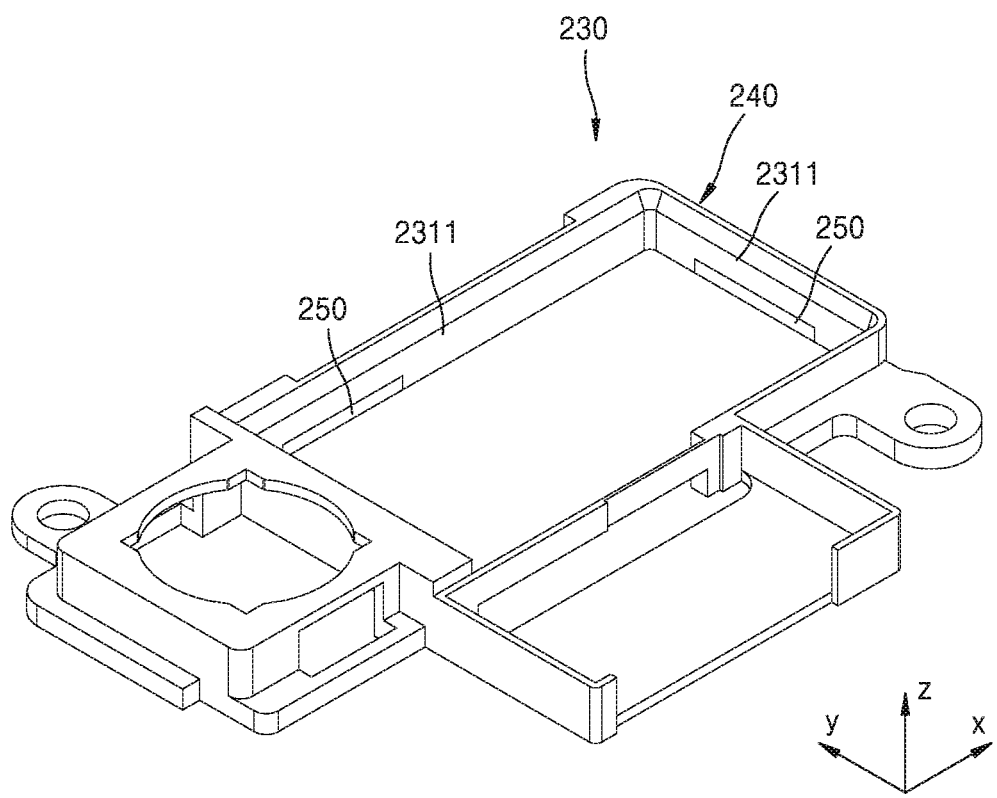
FIG. 17 is a perspective view of a supporting frame according to another embodiment of the disclosure.
Figure 18:
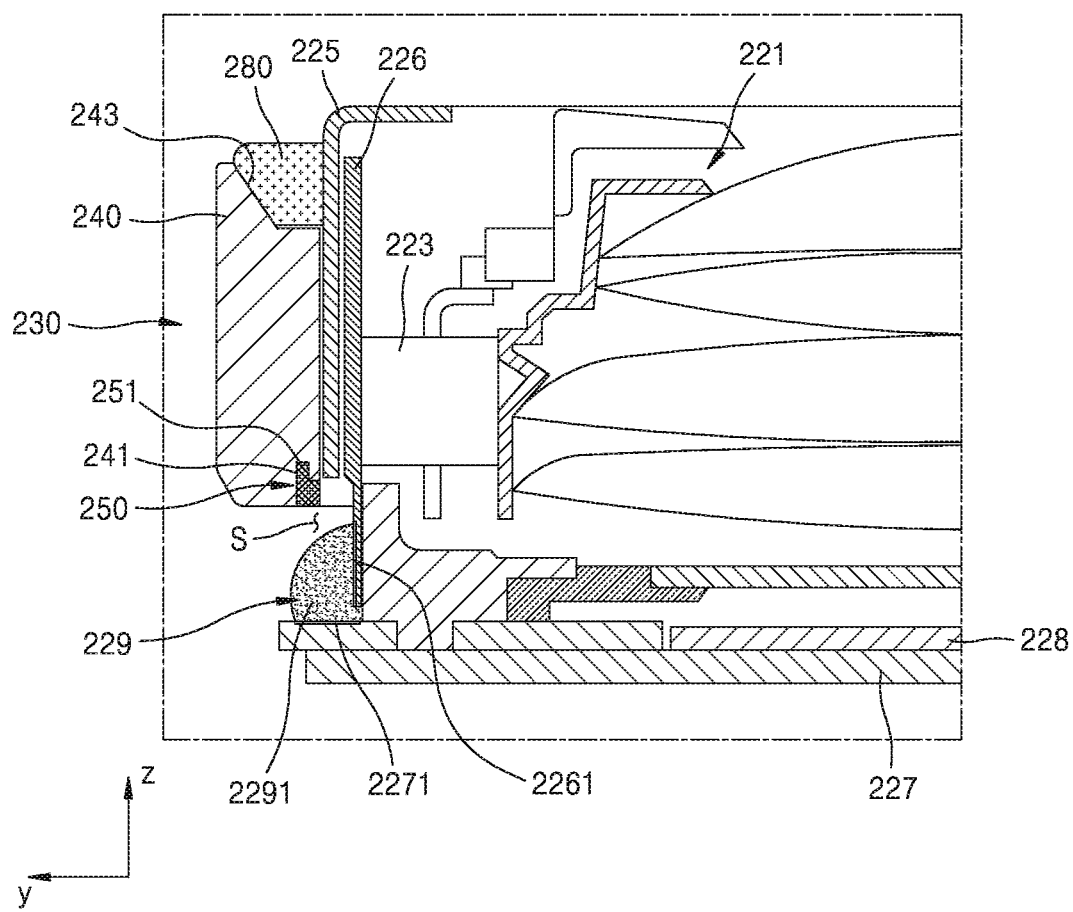
FIG. 18 is a cross-sectional view for describing a camera assembly according to another embodiment of the disclosure.

FIG. 13 is a perspective view of a portion of the camera assembly 200 of FIG. 3 at another angle, FIG. 14 is a perspective view of the supporting frame 230 of FIG. 3 at another angle, and FIG. 15 is a partially exploded view of the camera assembly 200 of FIG. 3. FIG. 16 is a perspective view of the camera assembly 200 according to another embodiment of the disclosure, and FIG. 17 is a perspective view of the supporting frame 230 according to another embodiment of the disclosure. FIG. 18 is a cross-sectional view for describing the camera assembly 200 according to another embodiment of the disclosure. For convenience of explanation, a first adhesive part 270 is omitted in FIGS. 13 and 15.

Referring to FIGS. 13 to 15, the plurality of solder balls 2290 may be arranged in a certain direction. The short-circuit prevention part 250 may extend in a direction parallel to the direction in which the plurality of solder balls 2290 are arranged.

The short-circuit prevention part 250 may be provided at a position corresponding to a camera module. For example, the short-circuit prevention part 250 may be provided in the metal body 240 at a position corresponding to the first camera module 211, and the short-circuit prevention part 250 may be provided in the metal body 240 at a position corresponding to the second camera module 212.

Short-circuit prevention parts 250 may be provided under a sidewall of the metal body 240 corresponding to respective conductive connecting parts 229 of the first camera module 211 and the second camera module 212.

For example, as shown in FIGS. 13 and 14, in a structure in which the conductive connecting part 229 of the first camera module 211 and the conductive connecting part 229 of the second camera module 212 are arranged in the same direction, a plurality of short-circuit prevention parts 250 may be provided on the first sidewall 2311 of the metal body 240 in the same direction.

In another example, as shown in FIGS. 16 and 17, in a structure in which the conductive connecting part 229 of the first camera module 211 and the conductive connecting part 229 of the second camera module 212 are arranged in different directions, a plurality of short-circuit prevention parts 250 may be provided on the first sidewall 2311 of the metal body 240 in different directions.

Referring back to FIGS. 13 to 14, lengths L3 and L4 of the short-circuit prevention parts 250 may be equal to or greater than lengths L1 and L2 of the conductive connecting parts 229, respectively. For example, a length L3 of the short-circuit prevention part 250 of the first camera module 211 may be greater than a length L1 of the conductive connecting part 229 of the first camera module 211, and a length L4 of the short-circuit prevention part 250 of the second camera module 212 may be greater than a length L2 of the conductive connecting part 229 of the second camera module 212. The lengths L1 and L2 of the conductive connecting parts 229 may each be equal to or greater than a length of the first conductive region 2271 or a length of the second conductive region 2261.

The short-circuit prevention part 250 of the first camera module 211 and the short-circuit prevention part 250 of the second camera module 212 may be spaced a certain distance D1 apart from each other. For example, the short-circuit prevention part 250 of the first camera module 211 and the short-circuit prevention part 250 of the second camera module 212 may be spaced apart from each other by a distance D2 between the conductive connecting part 229 of the first camera module 211 and the conductive connecting part 229 of the second camera module 212.

Referring back to FIGS. 4 to 7, each of the first camera module 211 and the second camera module 212 may further include a first adhesive member 270 for adhering the lens barrel 221 and the first circuit board 227 to each other.

Referring to FIG. 7, the first adhesive member 270 may cover the conductive connecting part 229. A portion of the first adhesive member 270 contacts the lens housing 225, another portion of the first adhesive member 270 contacts the conductive connecting part 229, and another portion of the first adhesive member 270 contacts the first circuit board 227.

The first adhesive member 270 is provided between the conductive connecting part 229 and the metal body 240 and may block electrical contact between the conductive connecting part 229 and the metal body 240.

However, the first adhesive member 270 may be broken or peeled off during a manufacturing process or by an external impact. Even in this case, the short-circuit prevention part 250 provided below the metal body 240 may block electrical contact between the metal body 240 and the conductive connecting part 229.

The short-circuit prevention part 250 may be provided to be spaced apart from the first adhesive member 270. However, the short-circuit prevention part 250 may momentarily collide with the first adhesive member 270 due to an external impact.

The short-circuit prevention part 250 may include an elastically-deformable material to minimize shock transmitted to the first adhesive member 270 or the conductive connecting part 229 even when the short-circuit prevention part 250 collides with the first adhesive member 270.

For example, the short-circuit prevention part 250 may include a silicone resin. However, the material constituting the short-circuit prevention part 250 is not limited thereto, and other materials may be included as long as it is a non-conductive and elastic material.

The first adhesive member 270 is an optional component of the camera assembly 200 and may be omitted as needed. For example, as shown in FIG. 18, in the camera assembly 200, the short-circuit prevention part 250 may directly face the conductive connecting part 229 without the first adhesive member 270.

Referring back to FIG. 6, a second adhesive member 280 may be provided between the supporting frame 230 and the lens barrel 221. For example, the second adhesive member 280 may be provided between the metal body 240 and the lens housing 225. The metal body 240 may include an accommodation groove 243 in which the second adhesive member 280 is provided. A camera module may be fixed to the supporting frame 230 by the second adhesive member 280.

The descriptions have been given above for an embodiment in which the short-circuit prevention parts 250 are applied to the first camera module 211 and the second camera module 212. However, the arrangement of the short-circuit prevention parts 250 is not limited thereto, and the short-circuit prevention part 250 may be applied to any one of the first camera module 211 and the second camera module 212 or may be applied to another camera module.

Also, descriptions have been given for an embodiment in which the camera assembly 200 is provided to face rearward in the electronic device 100, but the disclosure is not limited thereto. The embodiments of the disclosure described above may be unlimitedly applied to a structure in which the camera assembly 200 is provided to face forward, as long as the camera assembly 200 includes the plurality of camera modules 211, 212, 213, and 214 and the supporting frame 230 for supporting the same.

A camera assembly and an electronic device according to embodiments of the disclosure may prevent a short circuit between a camera module and a supporting frame that surrounds the camera module and includes a metal.

The above embodiments of the disclosure are merely examples, and various modifications and equivalent other embodiments of the disclosure may be made by one of ordinary skill in the art. Accordingly, the scope of protection of the disclosure should be determined by the technical idea of the appended claims.

What is claimed is:

1. A camera assembly embedded in an electronic device, the camera assembly comprising:
   a plurality of camera modules; and
   a supporting frame configured to support the plurality of camera modules,
   wherein at least one camera module of the plurality of camera modules comprises:
   a lens barrel;
   a lens driving assembly configured to move the lens barrel;
   a lens housing configured to accommodate the lens barrel and the lens driving assembly;
   a first circuit board on which an image sensor is provided; and
   a conductive connecting part configured to electrically connect the first circuit board and the lens driving assembly, and
   wherein the supporting frame comprises:
   a metal body configured to surround at least portions of edges of the lens housing; and
   a short-circuit prevention part provided on a surface of the metal body facing the conductive connecting part, and comprising a non-conductive material to block electrical contact between the metal body and the conductive connecting part.

2. The camera assembly of claim 1, wherein a space is provided between the first circuit board and the supporting frame for exposing the conductive connecting part in a direction perpendicular to an optical axis direction exists.

3. The camera assembly of claim 2, wherein the conductive connecting part comprises an overlapping portion overlapping the supporting frame in the optical axis direction.

4. The camera assembly of claim 3, wherein the overlapping portion protrudes outward beyond an edge of the lens housing.

5. The camera assembly of claim 1, wherein the short-circuit prevention part comprises a synthetic resin.

6. The camera assembly of claim 1, wherein the first circuit board comprises a plurality of first conductive regions electrically connected to the image sensor,
   wherein a second circuit board comprising a plurality of second conductive regions electrically connected to the lens driving assembly is provided on an inner surface of the lens housing, and
   wherein the conductive connecting part electrically connects the plurality of first conductive regions and the plurality of second conductive regions.

7. The camera assembly of claim 6, wherein a length of the short-circuit prevention part is equal to or greater than a length of the conductive connecting part.

8. The camera assembly of claim 1, wherein at least portions of surfaces of the short-circuit prevention part and the metal body facing each other have corresponding concavo-convex shapes.

9. The camera assembly of claim 1, further comprising an adhesive part fixing the lens barrel and the first circuit board and covering the conductive connecting part.

10. The camera assembly of claim 9, wherein the short-circuit prevention part comprises an elastically-deformable material.

11. An electronic device comprising:
    a housing; and
    a camera assembly provided in the housing,
    wherein the camera assembly comprises:
    a plurality of camera modules; and
    a supporting frame configured to support the plurality of camera modules,
    wherein at least one camera module of the plurality of camera modules comprises:
    a lens barrel;
    a lens driving assembly configured to move the lens barrel;
    a lens housing configured to accommodate the lens barrel and the lens driving assembly;
    a first circuit board on which an image sensor is provided; and
    a conductive connecting part configured to electrically connect the first circuit board and the lens driving assembly, and
    wherein the supporting frame comprises:
    a metal body configured to surround at least portions of edges of the lens housing; and
    a short-circuit prevention part provided on a surface of the metal body facing the conductive connecting part, and comprising a non-conductive material to block electrical contact between the metal body and the conductive connecting part.

12. The electronic device of claim 11, wherein a space is provided between the first circuit board and the supporting frame for exposing the conductive connecting part in a direction perpendicular to an optical axis direction.

13. The electronic device of claim 12, wherein the conductive connecting part comprises an overlapping portion overlapping the supporting frame in the optical axis direction.

14. The electronic device of claim 13, wherein the overlapping portion protrudes outward beyond an edge of the lens housing.

15. The electronic device of claim 11, wherein the short-circuit prevention part comprises a synthetic resin.

16. The electronic device of claim 11, wherein the first circuit board comprises a plurality of first conductive regions electrically connected to the image sensor,
- a second circuit board comprising a plurality of second conductive regions electrically connected to the lens driving assembly is provided on an inner surface of the lens housing, and
- the conductive connecting part electrically connects the plurality of first conductive regions and the plurality of second conductive regions.

17. The electronic device of claim 16, wherein a length of the short-circuit prevention part is equal to or greater than a length of the conductive connecting part.

18. The electronic device of claim 11, wherein at least portions of surfaces of the short-circuit prevention part and the metal body facing each other have corresponding concavo-convex shapes.

19. The electronic device of claim 11, further comprising an adhesive part fixing the lens barrel and the first circuit board and covering the conductive connecting part.

20. The electronic device of claim 19, wherein the short-circuit prevention part comprises an elastically-deformable material.

* * * * *